Nov. 3, 1925.
F. BENZ
1,559,841
SYSTEM OF WATER CONSERVATION
Filed May 27, 1924     3 Sheets-Sheet 1
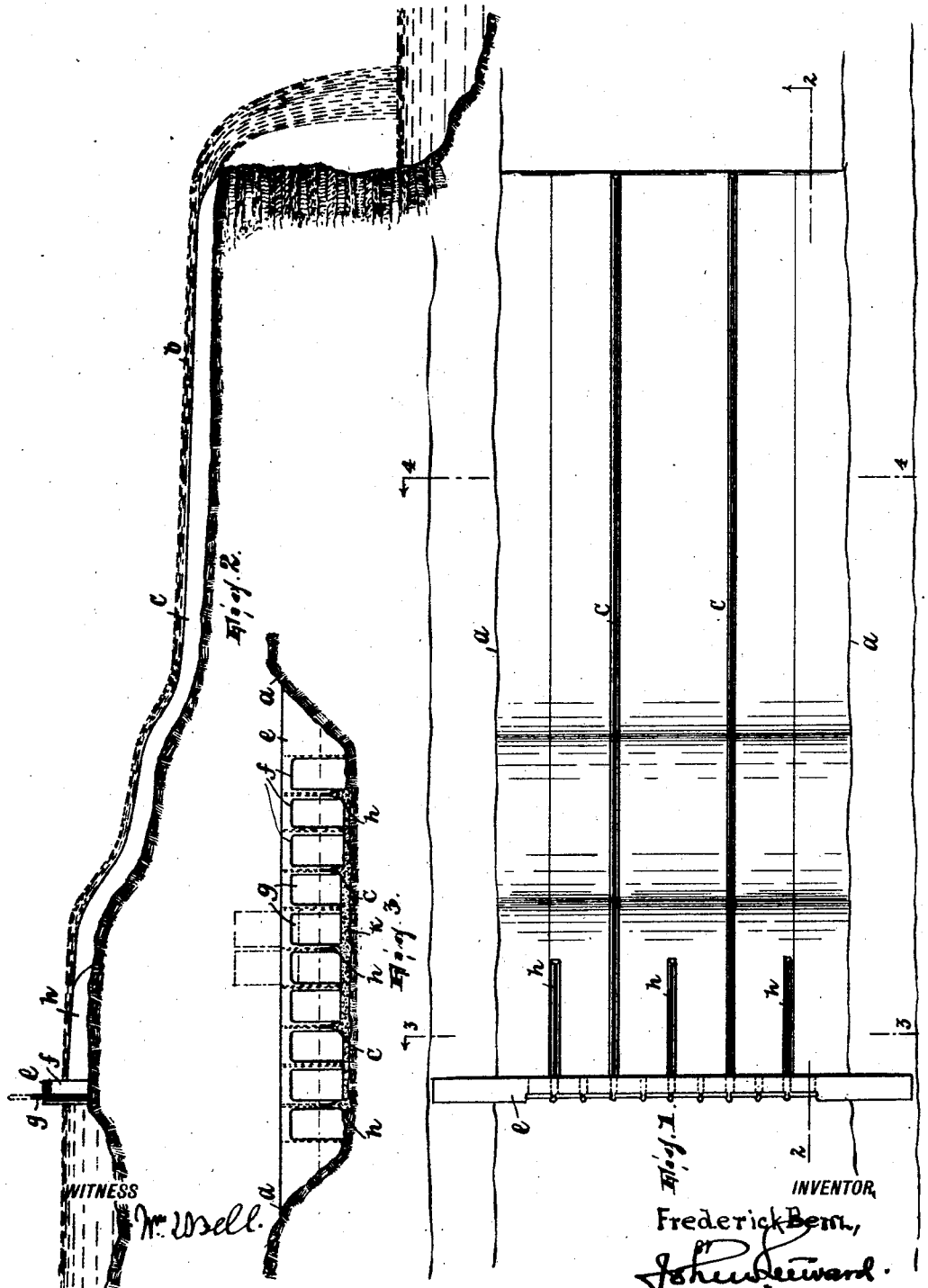
INVENTOR
Frederick Benz,
ATTORNEY

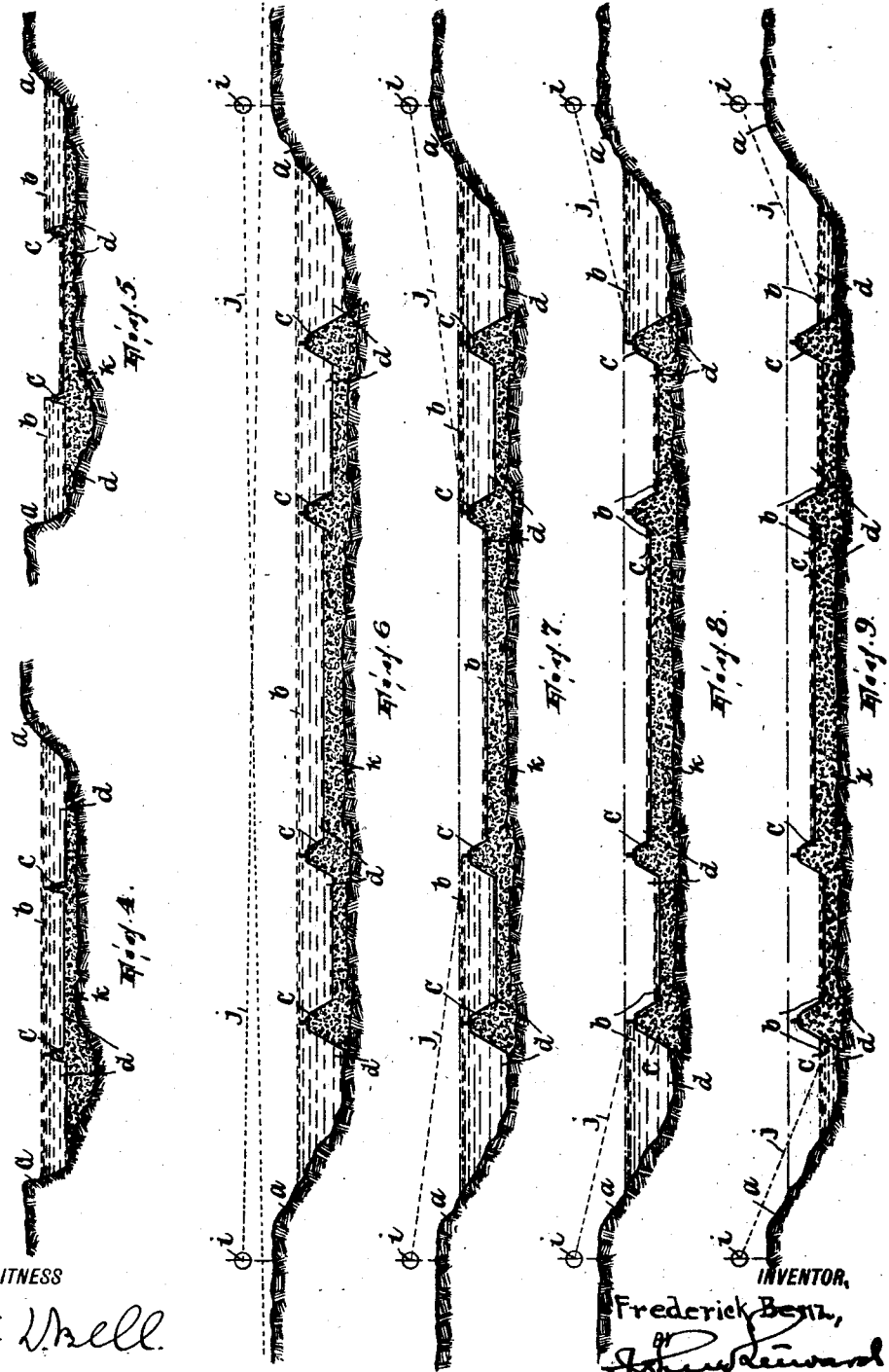

Nov. 3, 1925.  
F. BENZ  
1,559,841  
SYSTEM OF WATER CONSERVATION  
Filed May 27, 1924   3 Sheets-Sheet 3
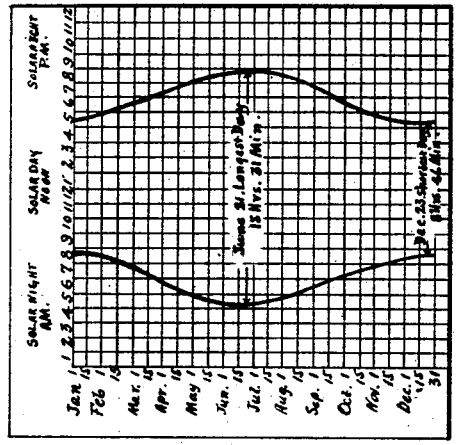
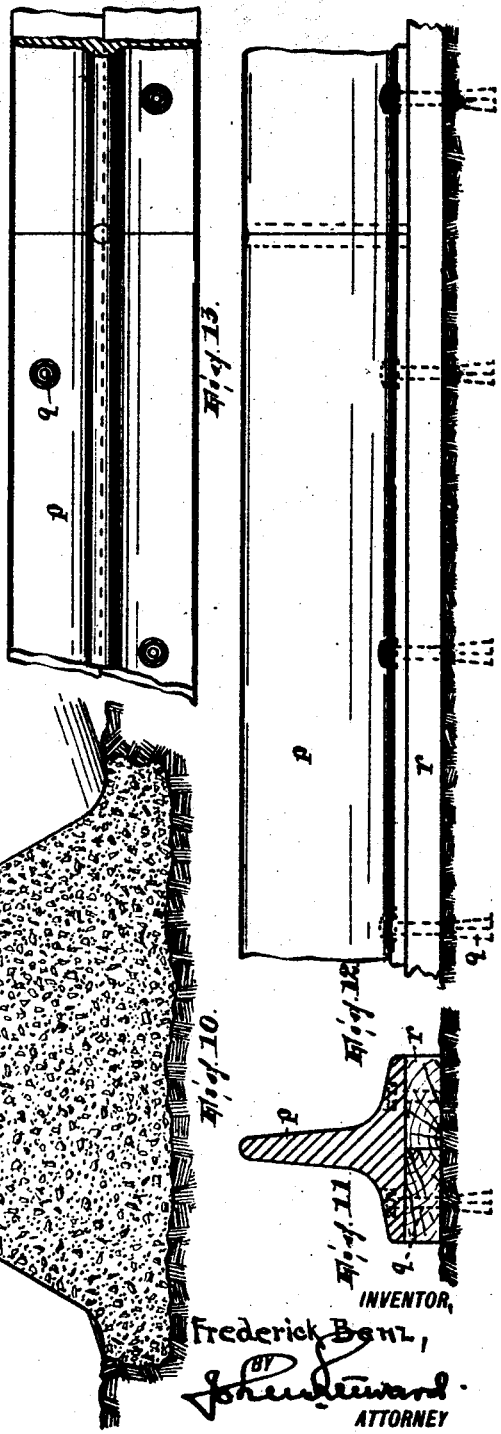
WITNESS
INVENTOR,
Frederick Benz,
ATTORNEY Patented Nov. 3, 1925.

1,559,841

UNITED STATES PATENT OFFICE.

FREDERICK BENZ, OF HALEDON, NEW JERSEY.

SYSTEM OF WATER CONSERVATION.

Application filed May 27, 1924. Serial No. 716,103.

*To all whom it may concern:*

Be it known that I, FREDERICK BENZ, a citizen of the United States, residing at Haledon, in the county of Passaic and State of New Jersey, have invented certain new and useful Improvements in Systems of Water Conservation, of which the following is a specification.

This invention has for its object to provide a system for the control of water flowing in a river having scenic attractiveness, as the Niagara River for example, to the end that conservation of the water for useful purposes and the uninterrupted preservation of the appearance of the river as a part of the natural landscape may both be attained.

To this end my invention broadly contemplates the employment of a sluice wall or walls generally paralleling the course of the river in plan and being submerged and having its top surface generally paralleling the surface of the stream and means at the relatively upper end of such wall or plurality of walls, such as a dam with gates, for varying the flow of the water to the sluices formed laterally of the wall or each wall. It being desirable to maintain the scenic effect and also obtain conservation of the water, I not only by this system make possible the full scenic effect in the daytime, when the river is clearly visible, and a storing or conserving of the water in the nighttime, when the river is not visible, the water being allowed to flow freely through the sluices in the daytime and checked by the gates at night, but I can effect the transition from a condition of full flow in the daytime to a condition of more or less checked flow at night, and vice versa, so that during the transition period the appearance of the river will not change to the eye of the observer on the shore, but will be as if the river were at full flow; in other words, whenever there is visibility, though only more or less poor, I can carry on conservation in such a way that to the observer on the shore the appearance of the river itself remains unaffected by the checking of the flow which conservation involves. This is due to the sluice wall or walls being submerged and having the top surface thereof generally paralleling the surface of the stream, as stated, and is accomplished by checking the flow progressively, as to the different sluices, toward the shore as night falls or the visibility otherwise decreases and releasing the flow progressively, as to such sluices, from the shore as day approaches or the visibility otherwise increases.

In order to increase the conservation possible by holding back the water when the visibility is good as well as when it is bad I have in addition to the foregoing provided for grading the elevations of the beds of the sluices so that the bed of the sluice which is the more remote from the observer is the higher and that nearest the shore is the lower; thus, while the stream is shallowed at the part remote from the observer, and to that extent the stream will be checked and the water conserved, the fact that it is shallower than at the part of the stream near the shore will not be apparent to the observer on the shore because of the difference in the two distances. While I claim this herein in combination with the submerged sluice walls and the means for varying the flow of water to the sluices, so far as I am aware it is new to provide means obstructing the flow of the stream throughout a substantial part of the width thereof and from the bottom upward and having a generally flat top surface forming a part of the stream bed and arranged higher than the portion of the stream bed between said means and one shore and also higher than the part of the stream bed upstream-adjacent said means, so that there will be constant conservation and the appearance of the stream as to depth will not be affected; and this I therefore claim independently.

In the drawings,

Fig. 1 is a plan of the system applied to the scenic part of a river, such as the Niagara River just above the Falls;

Fig. 2 is a longitudinal section on line 2—2 in Fig. 1;

Fig. 3 is a transverse section on line 3—3, of Fig. 1;

Figs. 4 and 5 are transverse sections on line 4—4 of Fig. 1, Fig. 4 showing the condition of the stream when the visibility is good and the water is being allowed to flow freely and Fig. 5 showing the condition of the stream when the visibility is poor and the water is being conserved;

Figs. 6, 7, 8 and 9 are transverse sections of a system in which there are more than two walls (as in Figs. 3, 4 and 5) and show the conditions of the stream at different stages in its control as between the times of good visibility and poor visibility; these views also show the grading of the elevation of the beds of the sluices;

Fig. 10 is a sectional perspective of one form of construction of said walls;

Figs. 11, 12 and 13 are a transverse sectional view, a side elevation and a plan of another form thereof; and Fig. 14 is a chart illustrating the changes in visibility for night and morning during the different months in the year.

The banks or sides of the course of a river or other stream are shown at $a\ a$, in Figs. 1, 3 and 4 to 9; in Figs. 1 and 3 the flowing water, appearing in Figs. 2 and 4 to 9 at $b$, is omitted.

In all the views it is assumed in the present case that each side of the river is scenically attractive from the opposite side and that each side is accessible to one observing the opposite side. Therefore in the present case all the views which illustrate the stream show at least two walls to form the sluice, so that the mentioned checking of the flow of the stream progressively toward the shore as the visibility decreases is from about the middle of the stream and the release of the flow progressively from the shore as the visibility increases is toward about the middle of the stream.

The walls to form the sluices are indicated at $c$ and the sluices formed between them are indicated at $d$, the walls all generally paralleling the course of the river in plan (they being shown straight in Figure 1 because the part of the stream shown is there substantially straight) and the walls all being submerged below the surface of the body of water of the stream (and if it is a stream whose depth varies, then preferably below its lowest level) and having their top surfaces generally paralleling the surface of the stream as shown in Fig. 2.

At the head or upper end of the set of walls and traversing the stream from one bank to the other, is a dam $e$ which has openings $f$, one or more leading to each sluice, and valves or gates $g$ therefor, the open position of two of which is shown by dotted lines in Fig. 3; the gates may be opened and closed, as by raising and lowering them, in any way, each being operated, as to each sluice, independently of the others. $h$ designates partitions which extend downstream from the dam as is usual, they forming no part of the present invention.

During the daytime or when the visibility is best the valves or gates are all open and the stream flows through the sluices at its normal level as shown in Fig. 4. When the visibility begins to lessen the valves $g$ for the middle sluice in Figs. 1 to 5 are closed. The water in the middle sluice of course flows therefrom gradually, so that its surface falls gradually, and whereas the view of the surface of the stream to the middle thereof from the shore would be clear when the visibility is high, by the time the middle sluice is empty the visibility would be so far lessened that the surface of the stream could only be apparent from the shore at a point between the latter and the near wall $c$; thus, conservation of the water can be effected without the appearance of the stream to an observer on the shore being substantially changed.

This is more fully illustrated in Figs. 6 to 9. A point $i$ on each shore represents the eye of the observer and the line $j$ extending therefrom across the river indicates the range of view. In Fig. 6 this range is beyond the opposite shore; in Fig. 7, the visibility having lessened, the range of view is at a point between the two of the four walls which are the nearer to the shore occupied by the observer; and in Figs. 8 and 9 the range of view $j$ is between the shore and the nearest wall.

In a practical application of the system it will be best to form each sluice with a level-surface bed, as an artificial bed $k$ of concrete, as shown in Figs. 3, 4 and 5.

In Figs. 6 to 9 these beds between the sluices are graded in elevation, the one between the two middle walls being the highest. Of course these sluice beds, at least the one of the middle sluice, will be at a higher elevation than the level of the normal bed of the stream at a point above the system, and depending on the extent of its elevation represented thereby there will be a permanent holding back or damming of the stream above the system whether a dam of the conventional type shown by Figs. 1 to 3 is present or not and to that extent there will be a permanent conservation of water above the system of sluices, and at the same time the actual shallowing of the water at the middle will not be apparent.

The walls to form the sluices may be constructed in any way, but to adapt them to withstand the injurious influence of ice and other floating bodies I prefer to construct them either as shown in Fig. 10 or Figs. 11 to 13. In Fig. 10 $l$ is a concrete wall formed with upwardly sloping sides and capped by a steel sheathing $m$ suitably secured thereto as by the tie members $n$ embedded in the concrete, the sheathing being preferably backed by a cushioning body $o$, as wooden beams or planks. In Figs. 11 to 13 the walls are formed by steel rails $p$ of inverted T-shaped cross section which are secured to the bed of the river by tie members $q$ with wooden or other cushioning material $r$ intervening between them.

Fig. 14 shows a visibility chart which will be of service in determining the time, in the morning and in evening of each day throughout the year, at which the opening of the gates and the closing thereof should take place in order to obtain the maximum conservation and yet preserve the appearance of the stream substantially always the same to an observer on either shore.

Having thus fully described my invention, what I claim as new and desire to secure by Letters Patent is:

1. Means to conserve the water of a stream and maintain the surface thereof during changes in visibility uninterruptedly without substantial change to the eye of an observer on the shore of the stream consisting of a wall submerged in the stream and generally paralleling the course of the same in plan and also having its top surface generally paralleling the surface of the stream, and means at the upstream end portion of said wall to obstruct or leave free the flow of the stream at the side of the wall remote from one shore of the stream while leaving unobstructed the flow of the stream at the side of the wall which is the nearer to such shore.

2. Means to constantly conserve the water of a stream and also at intervals conserve the water thereof in additional quantity and maintain the surface of the stream during changes in visibility uninterruptedly without substantial change to the eye of an observer on the shore consisting of a wall submerged in the stream and generally paralleling the course of the same in plan and also having its top surface generally paralleling the surface of the stream, a bed for the stream arranged at the side of said wall remote from one shore of the stream and projecting at a higher elevation than the natural bed of the stream, and means at the up-stream end portion of said wall to obstruct or leave free the flow of the stream at said side of the wall while leaving unobstructed the flow of the stream at the side of the wall which is the nearer to such shore.

3. Means to conserve the water of a stream substantially without change in the appearance of the stream as viewed from one shore thereof, said means obstructing the flow of the stream throughout a substantial part of the width thereof and from the bottom upward and having a generally flat top surface forming a part of the stream bed and arranged higher than the portion of the stream bed between said means and one shore and also higher than the part of the stream bed upstream-adjacent to said surface.

4. The method of controlling the flow of water in a stream having submerged means, spaced from the shore, generally paralleling the course of the stream and having a top surface generally paralleling the surface of the stream, to form a plurality of sluices in the stream, which consists in checking the flow through the sluices one after another and toward the shore as the visibility decreases and reestablishing the flow through the sluices one after another from the shore as the visibility increases.

In testimony whereof I affix my signature.

FREDERICK BENZ.